No. 11,707. Reissued Jan. 3, 1899.

R. J. FISHER.

TYPE WRITING MACHINE.

(Application filed Oct. 19, 1898.)

5 Sheets—Sheet 1.

Witnesses

Jas. K. McLathran

D. E. Doyle

Robert J. Fisher, Inventor

By his Attorneys,

C. A. Snow & Co.

No. 11,707. Reissued Jan. 3, 1899.

R. J. FISHER.

TYPE WRITING MACHINE.

(Application filed Oct. 19, 1898.)

5 Sheets—Sheet 2.

Witnesses

Jas. K. McCathran

Robert J. Fisher, Inventor

By his Attorneys,

C. A. Snow & Co.

No. 11,707. Reissued Jan. 3, 1899.

R. J. FISHER.

TYPE WRITING MACHINE.

(Application filed Oct. 19, 1898.)

5 Sheets—Sheet 3.

Witnesses

Jas. K. McCathran

O. E. Foyle

Inventor

By his Attorneys, Robert J. Fisher

C. A. Snow & Co.

No. 11,707. Reissued Jan. 3, 1899.

R. J. FISHER.

TYPE WRITING MACHINE.

(Application filed Oct. 19, 1898.)

5 Sheets—Sheet 4.

Witnesses

Jas. K. McCathran

Robert J. Fisher, Inventor

By his Attorneys,

C. A. Snow & Co.

No. 11,707. Reissued Jan. 3, 1899.

R. J. FISHER.

TYPE WRITING MACHINE.

(Application filed Oct. 19, 1898.)

5 Sheets—Sheet 5.

Witnesses

Jas. K. McCathran

D. E. Hoyle

Robert J. Fisher, Inventor

By his Attorneys,

C. A. Snow & Co.

UNITED STATES PATENT OFFICE.

ROBERT JOSEPH FISHER, OF ATHENS, TENNESSEE, ASSIGNOR TO THE FISHER TYPEWRITER COMPANY, OF TENNESSEE.

TYPE-WRITING MACHINE.

SPECIFICATION forming part of Reissued Letters Patent No. 11,707, dated January 3, 1899.

Original No. 569,626, dated October 20, 1896. Application for reissue filed October 19, 1898. Serial No. 694,042.

*To all whom it may concern:*

Be it known that I, ROBERT JOSEPH FISHER, a citizen of the United States, residing at Athens, in the county of McMinn and State of Tennessee, have invented a new and useful Type-Writing Machine, of which the following is a specification.

My invention relates to type-writing machines, and particularly to improvements upon the constructions set forth in my applications, Serial No. 489,634, filed October 31, 1893, and Serial No. 517,324, filed July 12, 1894; and the objects in view are to improve the construction and arrangement of the type-bar-supporting ring and certain parts of the frame, whereby a view of the line of writing may be had at all times; to provide improved means for pivoting or mounting the type-bars upon the supporting-ring; to provide improved means for mounting the ribbon-spools and shields or guides, whereby said parts are made interchangeable to facilitate the adjustment of different kinds of ribbons, and to provide an improved carriage-feeding mechanism and in connection therewith a simple and efficient form of release mechanism.

Further objects and advantages of the invention will appear in the following description, and the novel features thereof will be particularly pointed out in the appended claims.

Figure 1:
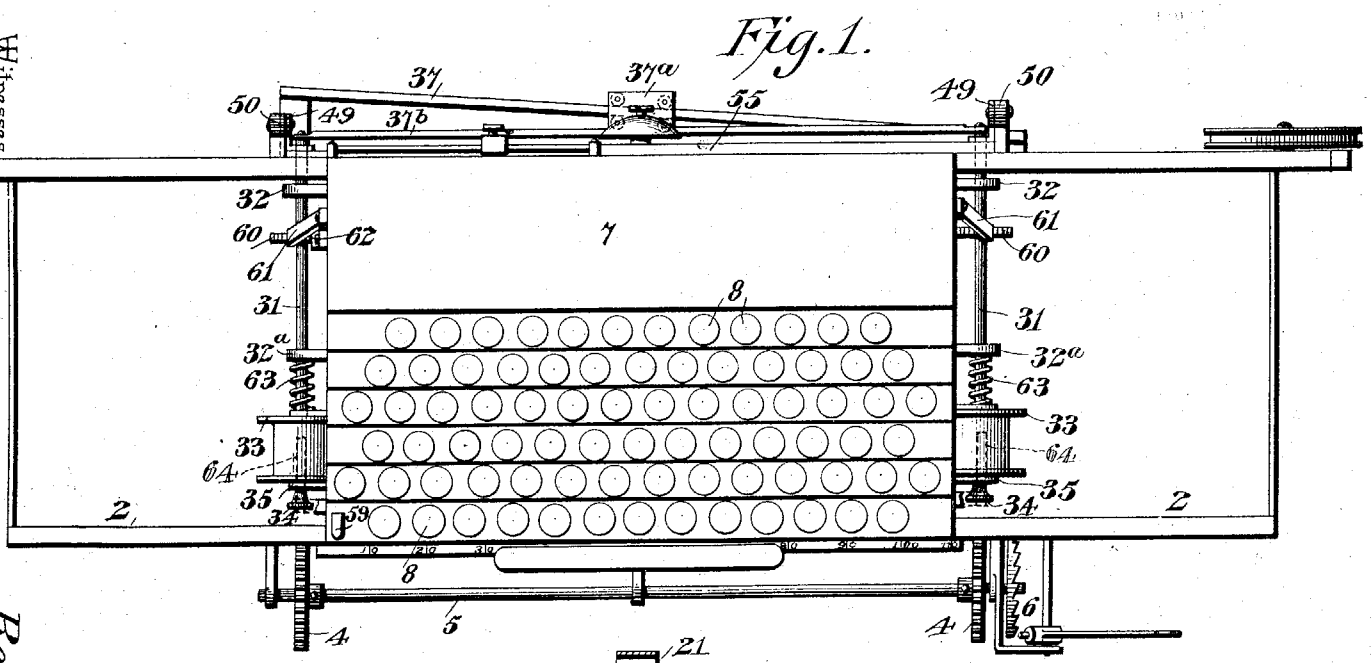
Figure 6:
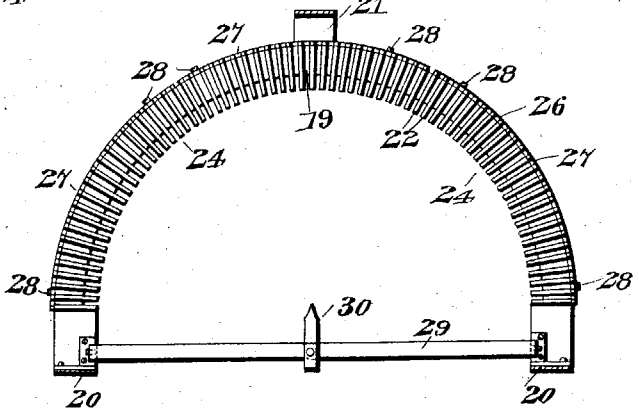
Figure 7:
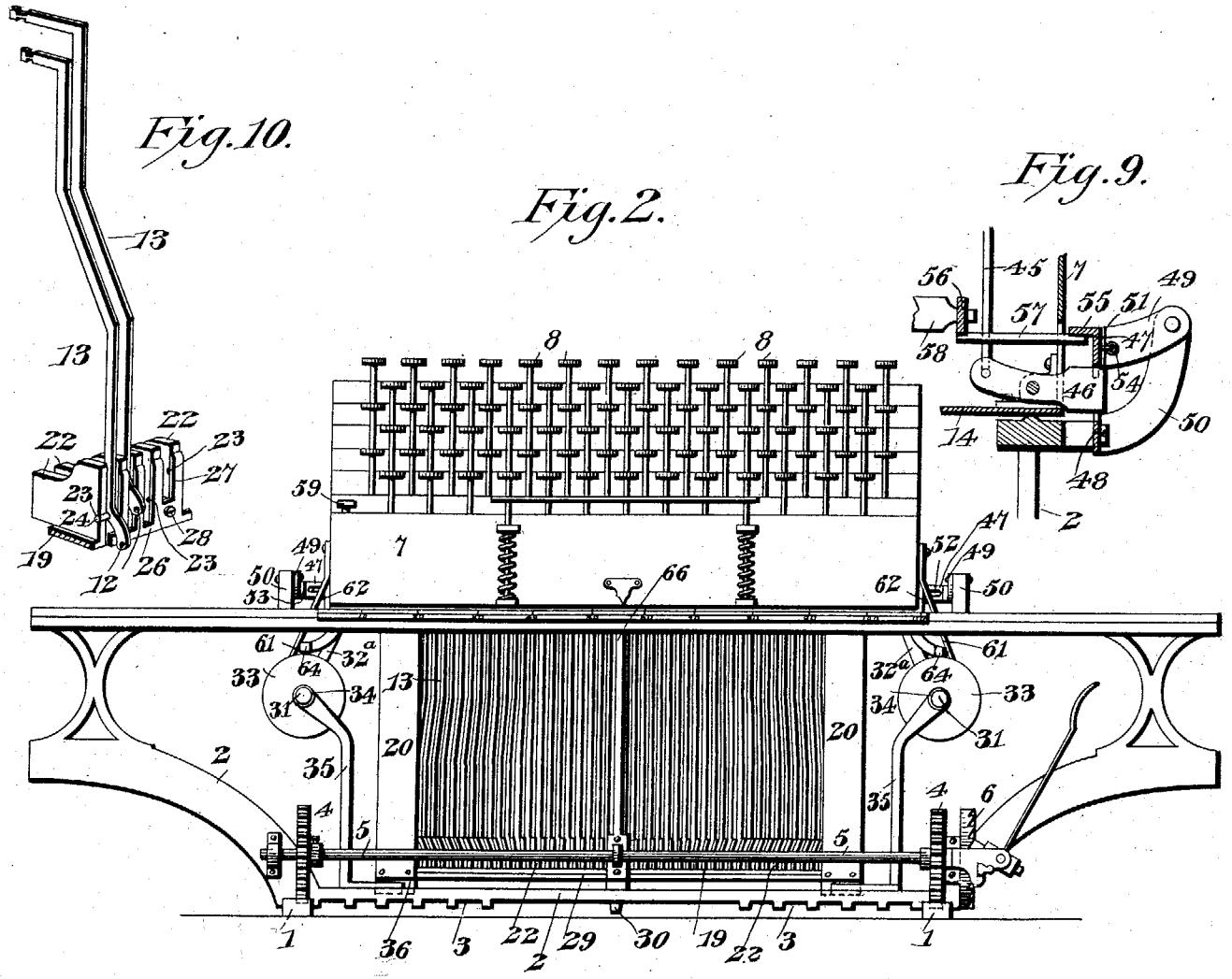
Figures 3, 7, 8:
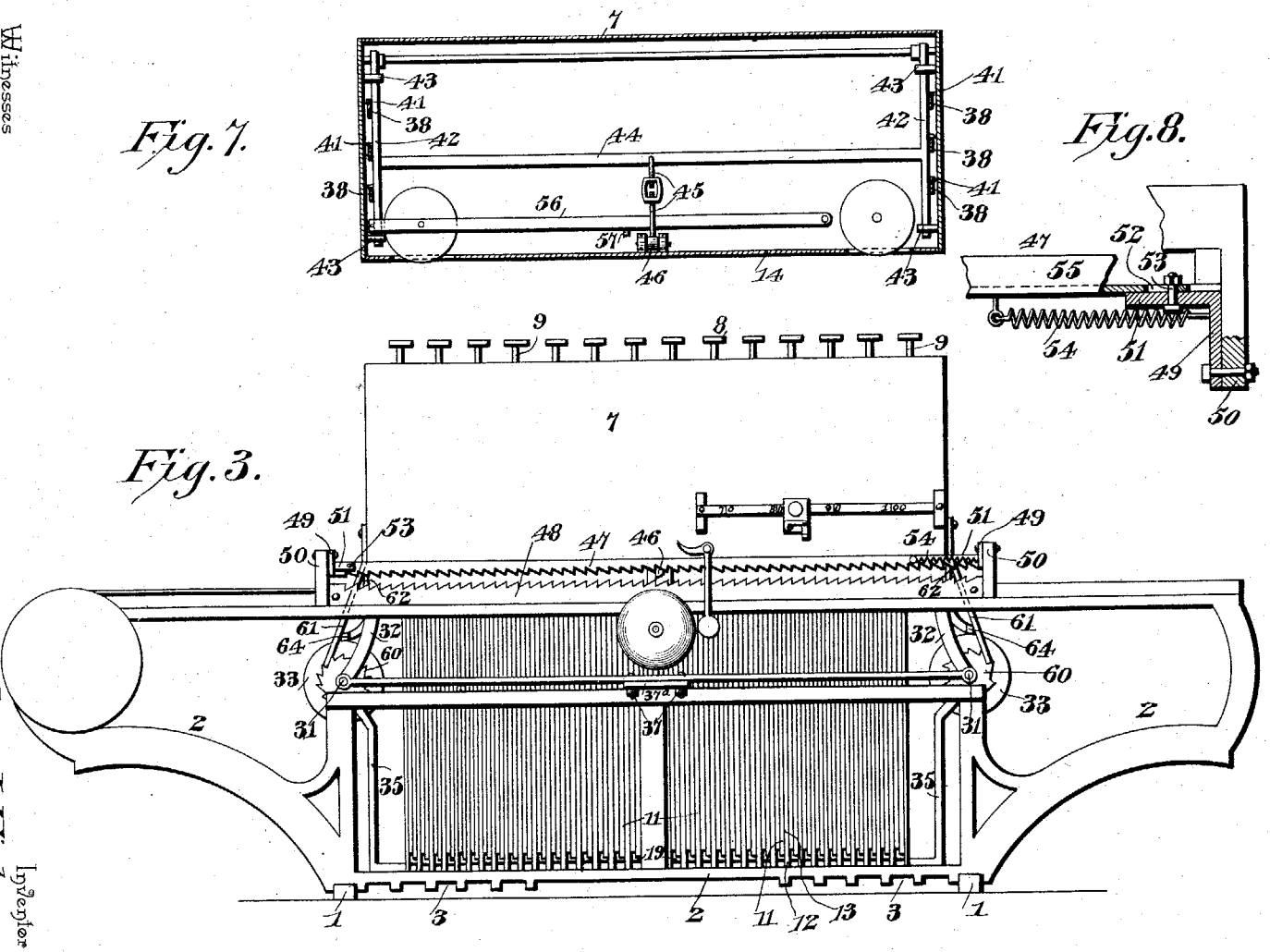
Figure 4:
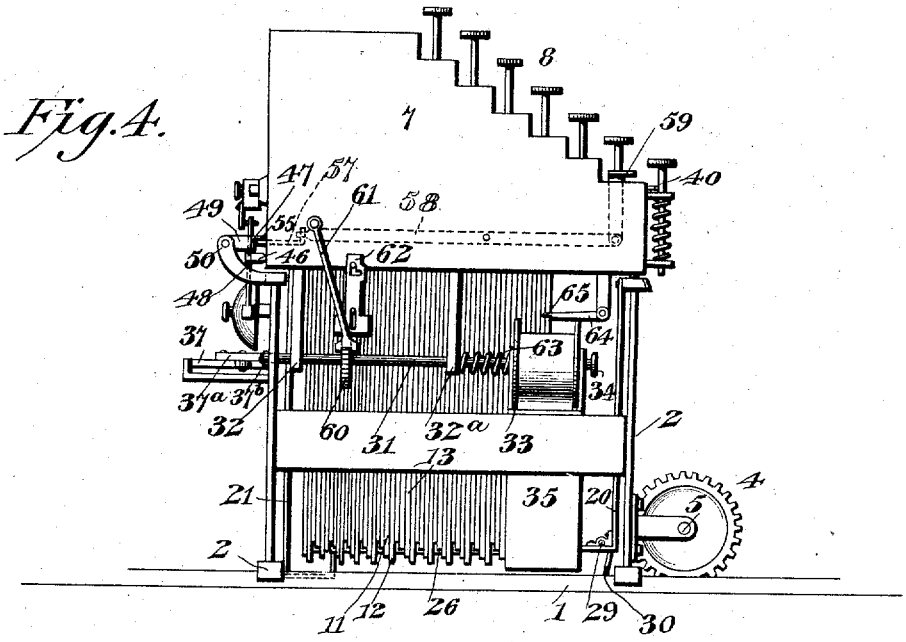
Figure 5:
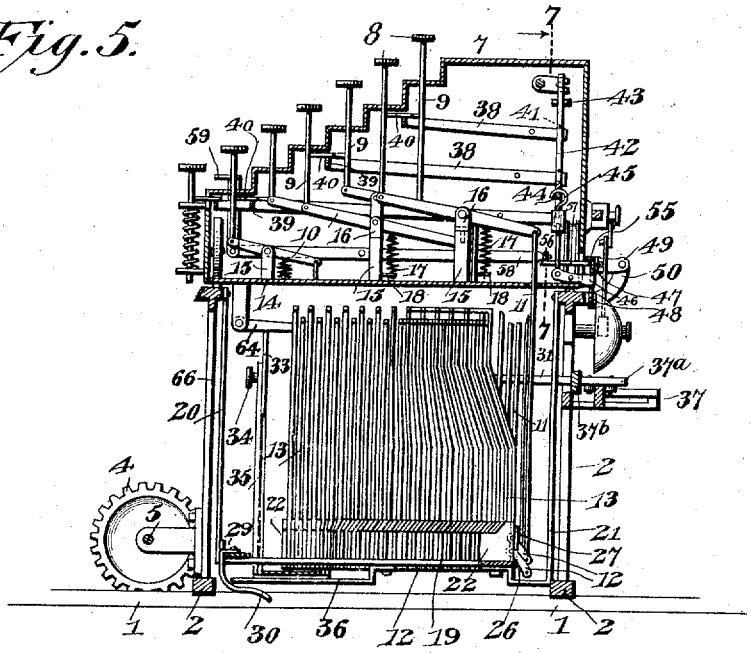
Figure 11:
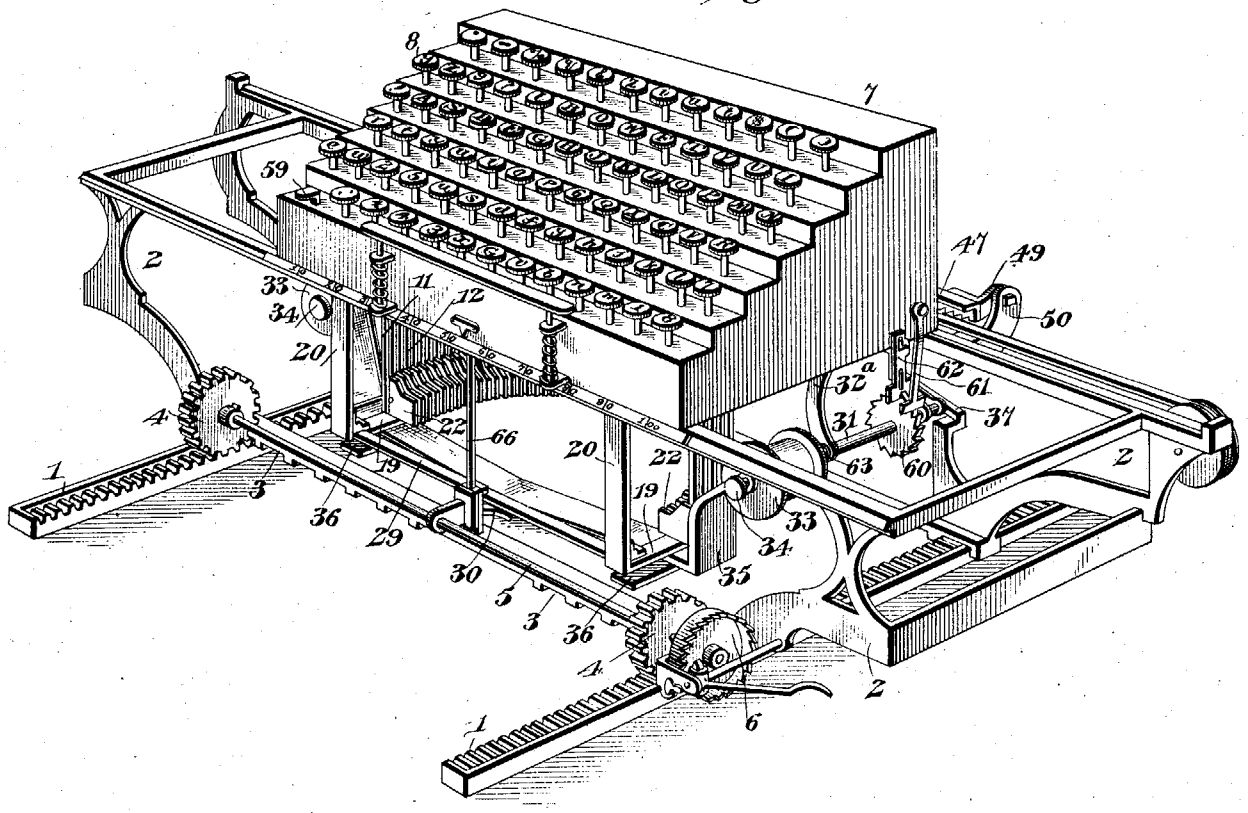

In the drawings, Figure 1 is a top plan view of a machine embodying my invention. Fig. 2 is a front view of the same. Fig. 3 is a rear view. Fig. 4 is a side view. Fig. 5 is a vertical sectional view. Fig. 6 is a plan view of the type-bar-supporting ring. Fig. 7 is a transverse section on the line 7 7 of Fig. 5. Fig. 8 is a detail horizontal section of one end of the movable ratchet-bar. Fig. 9 is a transverse vertical section through one end of the ratchet-bars to show the means for supporting the same. Fig. 10 is a detail view in perspective of a portion of the type-bar-supporting ring and type-bars. Fig. 11 is a perspective view of the complete machine to illustrate the permanent exposure of the line of writing, which is covered only by the inking-ribbon.

Similar numerals of reference indicate corresponding parts in all the figures of the drawings.

The general construction of the machine forming the subject-matter of the present invention is similar to that embodied in the above-mentioned previous applications and therefore it will be necessary herein to describe the same only briefly.

1 designates the track-rails upon which the machine is mounted; 2, the frame, which is notched, as shown at 3, to fit slidably upon the track-rails at different adjustments of the latter; 4, pinions meshing with the rack-teeth upon said track-rails and carried by a common spindle 5, and 6 the mechanism for operating said spindle to feed the machine upon the track-rails.

7 represents the carriage, upon which are mounted the vertically-movable keys 8, the stems 9 thereof being connected at their lower ends to the intermediately-pivoted levers 10, and the said levers being in turn connected by draw-wires 11 to the offset arms 12 of the type-bars 13. The carriage is mounted, as shown and described in said former applications, upon front and rear carriage-guides formed by the frame, the only difference in this case being that the guides are arranged close together. The carriage is arranged wholly between the vertical planes of said front and rear guides. The carriage is provided with a floor 14, which closes the bottom thereof, and rising from this floor is a series of posts or standards 15, having removable tips or caps 16, in the bifurcated upper extremities of which are pivoted said key-levers 10.

It is my intention to construct the carriage, as well as certain other parts of the mechanism, of a light metal, such as aluminium, and the standards or posts which support the key-levers will be of the same material; but as said metal does not form an efficient bearing for the key-levers it is desirable to employ a harder metal, such as steel, for the bearing portion, and hence the caps or tips which are attached to the upper ends of the standards or posts. The key-levers are held in their normal positions and are returned thereto after the keys connected therewith have been depressed by means of coiled springs 17, which are attached at their lower ends to lugs 18, integral with the posts or standards.

19 represents the type-bar-supporting ring, which is suspended from the carriage by means of side hangers 20, arranged contiguous to the vertical plane of the front carriage-guide and a rear hanger 21, and said ring is semicircular or crescent-shaped in plan, with its open side toward the front of the machine. The object in using a supporting-ring of this construction is to leave the front portion of the machine free from obstruction, whereby the line of writing may be viewed by the operator at any time by displacing the inking-ribbon hereinafter described. This ring is provided with a series of vertical radially-disposed webs 22, provided at their outer edges with seats 23 for the reception of the laterally-projecting pins 24 on the type-bars 13. The seats for the said pins or trunnions 24 are arranged alternately in different horizontal planes to avoid interference, and the type-heads carried by said type-bars are thus arranged at different distances from the pivotal points of the bars, whereby when the bars are in their normal or upright positions said type-heads are alternately disposed in different horizontal planes. By this arrangement the webs 22 and the type-bars 13 may be made to fit snugly and the type-bars may be arranged close together to allow the requisite number of bars to be arranged within the distance of a half-circle, as indicated in the drawings. In order to hold the pins or trunnions of the type-bars in place in their seats or bearings, I employ a flexible strip or plate 26, which is arranged upon the outer circumference of the type-bar-supporting ring and is provided with a series of notches or cut-away portions to agree with the intervals between the adjacent webs 22, the tongues 27 between said cut-away portions of the strip or plate lying against the outer surfaces of the webs and covering the seats or bearings. This strip or plate may be secured in place by means of screws 28, which engage threaded sockets in the supporting-ring, and said strip may, if preferred, be formed in sections, as shown. Connecting the extremities of the crescent-shaped supporting-ring is a narrow transverse bar 29, parallel with the line of writing, which supports a pointer 30 to indicate the position of the next type impression.

The arrangement of the ribbon-spool spindles 31 is similar to that described in my former applications, the bearings 32 and 32[a] thereof being arranged near the rear ends of the spindle and at intermediate points thereof, respectively, whereby the front ends of said spindles are free to permit of the removal, as desired, of the ribbon-spools 33, which are held in place by means of thumb-screws 34. The means for turning the ribbon-spools to feed the ribbon longitudinally are identical with those of my former application, Serial No. 517,324, and consist of a ratchet-wheel 60, fixed to a spool-spindle, a swinging arm 61, pivoted to the side of the carriage and provided at its free end with a head to engage the teeth of said wheel, and a retaining-pawl 62. The ribbon shields or guides 35 depend from the ribbon-spool spindle and are fitted at their lower ends in horizontal keepers 36, secured to the under side of the type-bar-supporting ring, the front ends of said keepers being open to provide for the removal of the shields or guides when the spools are detached from the spool-spindles to substitute a ribbon of a different kind. The spools are feathered upon the spindles, and the arms of the shields are slidably fitted upon the spindle at the opposite ends of the spools, whereby both move together to expose the line of writing. The spools and shields are returned to their normal position by a spring 63, and the thumb-screw 34 forms a stop to limit the forward movement of said parts. The means for feeding the ribbon transversely by imparting a longitudinal movement to the ribbon-spool spindles is similar to that described in my former applications, except that the bar 37, which guides the traveler 37[a], carried by a rod 37[b], connecting the rear ends of the ribbon-spool spindles, is inclined in the opposite direction, whereby as the carriage feeds to the right the ribbon-spools are moved forwardly.

Arranged within the carriage are the pivoted yokes 38, the cross-bars 39 of which are disposed, respectively, near the transverse series of key-shanks in position to be engaged by a stud 40 on said shanks, as in my former applications, and the extremities of the arms of said yokes are arranged in operative relation with studs 41 on the vertical slides 42, which are mounted between lugs 43 on the side walls of the carriage. These slides 42 are connected by a transverse bar 44, and supported by a wire 45 at the center of said bar 44 is the rear end of an operating-pawl 46, arranged between the toothed edges of the upper and lower ratchet-bars 47 and 48, mounted upon the framework. The lower ratchet-bar is fixed in position, and the upper ratchet-bar is carried by pivotal arms 49, connected to the upper ends of brackets 50, rising from the framework. These pivotal arms 49 carry guides 51, in which the ends of the upper ratchet-bar 47 are fitted, said ratchet-bar being provided with longitudinal slots 52, which receive guide-pins 53 in the guides. A spring 54 is employed to move the upper ratchet-bar in the direction opposite to the forward movement of the carriage when the operating-pawl is disengaged from the movable ratchet-bar and is engaged with the fixed ratchet-bar. The movable ratchet-bar is provided upon its front side with a rib or flange 55, forming a part of the releasing mechanism, and a lever 56, pivoted at one end to the rear wall of the carriage, is provided at an intermediate point with a finger 57, which operates in contact with the under side of said rib or flange.

This lever, which I will term the "release-lever," is operated by means of a release-key lever 58 in connection with the release-key 59.

When the release-key is depressed, thereby elevating the free end of the release-lever 56, the finger 57, acting upon the rib or flange 55, elevates the movable ratchet-bar and thus removes it from engagement with the pawl 46, whereby the carriage may be moved freely to the right or left. Pivotally connected to the sides of the carriage adjacent to the ribbon-spools are catches 64, having notches 65 to engage the flanges of the spools when the latter are pressed toward the rear against the tension of the spring 63 to expose the line of writing. These catches hold the spools, and hence the ribbon-shields and ribbon, in their repressed or displaced position, and then by depressing the release-key and thus disengaging the movable ratchet-bar from the pawl, the carriage may be moved to bring the pointer opposite the desired character or space to insert a letter or word or make a necessary correction.

It will be seen that the front of the framework between the terminal standards which support the front carriage-guide is entirely open, with the exception of a single narrow bar or upright 66, and that by reason of the above construction of the type-bar-supporting ring a view of the entire length of the line of writing may be had by the above-described displacement of the ribbon. Furthermore, it will be seen that I employ an ordinary form of keyboard, such as those now in use upon the Caligraph and similar machines, the near or front edge of the keyboard being arranged approximately over the front carriage-guide, and thereby within easy reach of the operator; but inasmuch as the crescent-shaped type-bar-supporting ring brings the printing-point close to the front of the machine or contiguous to the plane of the front carriage-guide the line of writing may be viewed by the operator without change of position, and at the same time all modifications of the construction or arrangement of the keyboard are avoided. In other words, I use a common or ordinary arrangement of keyboard and adapt the machine to suit the same, and yet allow an unobstructed view of the line of writing while the operator is in the natural position in front of the machine, and this desirable object is attained by elevating the carriage-guides, avoiding standards or other obstructing means between the intermediate portions of the front carriage-guide and the other parts of the framework, arranging the line-spacing and other mechanisms outside of the path of the carriage in traversing the tracks, and employing a crescent-shaped supporting-ring with the open side thereof to the front and with its extremities arranged contiguous to the vertical plane of the front carriage-guide. Furthermore, the use of the crescent-shaped type-bar-supporting ring is advantageous for the reason that while it is arranged between the vertical planes of the front and rear carriage-guides said guides may be arranged close together. In other words, the depth or distance from front to rear of the machine is reduced by the employment of the crescent ring, and the movement of the carriage in traversing the guides under the tension of the carriage-spring is regular or uniform, and the carriage is not subject to the twist or unequal strain to which one of greater length from front to rear would be liable. This arrangement also provides a more compact construction, and the downward stroke upon the keys in operating the machine falls between the planes of the guides, and hence does not affect the operation of the machine by counterbalancing any of the weight of the machine, as would occur if the keyboard were arranged in advance of the front guide. Furthermore, the arrangement of the keyboard between the vertical planes of the guides provides for simpler connections between the keys and the type-bars and avoids the necessity of carrying said connections over the front point of support of the carriage. Furthermore, as the keyboard is arranged above and the type-bar-supporting ring below the horizontal plane of the carriage-guides the weight of the carriage is distributed approximately equally above and below said guides, and hence the equilibrium thereof is preserved even when moved rapidly in the step-by-step movement due to the letter-spacing mechanism.

The means hereinbefore mentioned for mounting the key-levers, such means consisting of standards or posts rising from the closed floor of the carriage, provides for arranging the key-levers in the desired positions to bring the inner end directly under the key and in line with the direction of movement of the key-shank, while the other end of said lever is directly above the point of connection of its draw-wire with the short arm of the type-bar to which said draw-wire is attached. Thus the downward movement of a key is communicated directly and positively to one end of a key-lever, and the draw-wires are strained longitudinally, and no deflection or bending of the said wires is necessary. Said adjustment of the key-levers is facilitated by the removable tips or caps on the upper ends of the posts or standards, said tips or caps being adapted to be adjusted or turned to arrange the levers in the desired positions.

It will be obvious that in practice various changes in the form, proportion, and the minor details of construction may be resorted to without departing from the spirit or sacrificing any of the advantages of this invention.

Having described my invention, what I claim is—

1. In a type-writing machine, the combination of a framework having elevated front and rear carriage-guides parallel with the line of writing, the front guide being supported at its extremities whereby the view under the intermediate portion thereof is unobstructed, a carriage mounted upon said guides and having a pendent type-bar-supporting ring which is arranged below the plane of the carriage-guides, said supporting-ring being of crescent shape in plan with its open side to the front and its extremities contiguous to the vertical plane of the front guide and supported by hangers, printing mechanism, including type-bars mounted upon said supporting-ring and having their common printing-point midway between the front extremities of the supporting-ring and contiguous to the vertical plane of the front guide, whereby the line of vision of an operator passes under the front carriage-guide and embraces the entire line of writing between the extremities of the supporting-ring, the keyboard which is also supported by the carriage being arranged above the horizontal plane of the carriage-guides and between the vertical planes of the same with its front edge contiguous to the vertical plane of the front guide, and operating devices, substantially as specified.

2. The combination of a type-bar-supporting ring having spaced perpendicularly-disposed webs, type-bars arranged at their extremities between the webs and having trunnions mounted in open-sided seats in the outer edges of the webs, and a sectional flexible strip removably secured to the outer edge of the supporting-ring, each section of the strip having a plurality of perpendicularly-disposed tongues arranged in contact with the outer edges of said webs to close the outer sides of the seats, substantially as specified.

3. The combination with a supporting-framework having carriage-guides, a carriage mounted thereon and provided with feeding mechanism, type-bars, keys, and operating connections, of ribbon-spool spindles supported at one end and having the other end free, means for feeding said spindles longitudinally, ribbon-spools slidably and removably fitted upon the said free ends of the spindles, means for imparting rotary movement to the spindles and through the same to the spools, and ribbon shields or guides having arms fitted slidably upon and depending from the ribbon-spool spindles, and being arranged at opposite ends of the spools, substantially as specified.

4. The combination with a supporting-framework having carriage-guides, a carriage mounted thereon and provided with feeding mechanism, type-bars, keys, and operating connections, of ribbon-spool spindles supported at one end and having the other end free, ribbon-spools removably fitted upon the free ends of the spindles, means for imparting longitudinal and rotary movement to the spindles, removable stops attached to the free extremities of the spindles, springs arranged in rear of the spools to hold them normally in contact with the stops, and ribbon shields or guides fitted to slide upon the ribbon-spool spindles and removable therefrom with the spools, said shields or guides having arms arranged respectively at opposite ends of the spools, substantially as specified.

5. The combination with a supporting-framework having carriage-guides, a carriage mounted upon the guides and provided with feeding mechanism, type-bars, keys, and operating connections, of ribbon-spool spindles, mounted in bearings on the side walls of the carriage, said bearings being arranged respectively near the rear and at an intermediate point of each spindle, means for feeding the spindles longitudinally, ribbon-spools feathered upon the spindles, springs for holding the spools in their normal or operative positions, removable stops attached to the free front extremities of the spindles and consisting of thumb-screws, means for imparting a rotary movement to the spindles, and ribbon shields or guides depending from the ribbon-spool spindles and removable therefrom with the spools, substantially as specified.

6. The combination with a supporting-framework having carriage-guides, a carriage mounted thereon and provided with feeding mechanism, type-bars, keys, and connections, of ribbon-spool spindles and means for feeding the same longitudinally, ribbon-spools removably attached to said spindles, means for imparting a rotary movement to the spindles, ribbon shields or guides depending from the ribbon-spool spindles, and keepers arranged contiguous to the writing plane and having open front ends, adapted to receive the lower ends of the ribbon shields or guides, substantially as specified.

7. In a type-writing machine, carriage-feeding mechanism having oppositely-disposed ratchet-bars arranged in a common plane with facing toothed edges, one of said bars being mounted for limited longitudinal movement and being spring-actuated to return it to its normal position and the other bar being fixed, said movable ratchet-bar being also mounted for transverse movement in the plane of the fixed bar, a rigid operating-pawl arranged between the toothed edges of the bars and having opposite integral teeth or edges adapted, respectively, to engage the teeth upon the ratchet-bars, and normally in engagement with the longitudinally-movable ratchet-bar, means for vibrating the pawl to cause alternate engagement with the ratchet-bars, and release mechanism for imparting transverse movement to the movable ratchet-bar to disengage it from the dog and allow free backward-and-forward movement of the carriage, substantially as specified.

8. The combination with a supporting-framework, a carriage, type-bars, keys, and operating connections, of carriage-feeding mechanism having a fixed ratchet-bar and a vertically and longitudinally movable ratchet-bar arranged with their toothed edges parallel and spaced apart, an operating-pawl arranged between and adapted to engage the toothed edge of either ratchet-bar, a spring to actuate the movable ratchet-bar longitudinally when released, a releasing-lever operatively connected with the movable ratchet-bar and adapted to move the same vertically to disengage it from the operating-pawl, a release-key, and connections, substantially as specified.

9. The combination with a supporting-framework, a carriage, type-bars, keys, and operating connections, of carriage-feeding mechanism having a fixed ratchet-bar and a vertically and longitudinally movable ratchet-bar, and the movable ratchet-bar being provided with a longitudinal rib or flange, an operating-pawl adapted to engage the toothed edge of either ratchet-bar, a spring for actuating the movable ratchet-bar and imparting a longitudinal movement thereto when released, a releasing-lever provided with a finger arranged in operative relation with said rib or flange on the movable ratchet-bar, a release-key, and connections between said key and the releasing-lever, substantially as specified.

10. The combination with a supporting-framework, a carriage, type-bars, keys, and operating connections, of carriage-feeding mechanism having a fixed ratchet-bar and a parallel vertically and longitudinally movable ratchet-bar, swinging arms provided with guides in which the ends of said movable ratchet-bar are slidably mounted, a spring for moving the slidable ratchet-bar longitudinally when released, an operating-pawl arranged to engage the toothed edge of either ratchet-bar, and normally in engagement with the movable ratchet-bar, a releasing-lever operatively connected with the movable ratchet-bar and adapted when actuated to move the said ratchet-bar vertically from the fixed ratchet-bar to disengage its teeth from the operating-pawl, a release-key, and connections between the release-key and the releasing-lever, substantially as specified.

In testimony that I claim the foregoing as my own I have hereto affixed my signature in the presence of two witnesses.

ROBERT JOSEPH FISHER.

Witnesses:
WILLIAM A. CUNNINGHAM,
CHARLES T. RIDDLE.